(12) United States Patent
Pontecorvi et al.

(10) Patent No.: US 11,943,211 B2
(45) Date of Patent: Mar. 26, 2024

(54) DEVICE MONITORING IN ACCESSING NETWORK

(71) Applicant: NOKIA TECHNOLOGIES OY, Espoo (FI)

(72) Inventors: Matteo Pontecorvi, Palaiseau (FR); Matteo Signorini, Palaiseau (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 207 days.

(21) Appl. No.: 17/320,845

(22) Filed: May 14, 2021

(65) Prior Publication Data

US 2021/0359984 A1 Nov. 18, 2021

(30) Foreign Application Priority Data

May 14, 2020 (EP) .................................... 20174547

(51) Int. Cl.
*H04L 9/40* (2022.01)
*H04L 9/06* (2006.01)

(52) U.S. Cl.
CPC ............ *H04L 63/08* (2013.01); *H04L 9/0637* (2013.01)

(58) Field of Classification Search
CPC ... H04L 63/08; H04L 9/0637; H04L 41/0866; H04L 41/28
See application file for complete search history.

(56) References Cited

U.S. PATENT DOCUMENTS

| 5,481,532 A | * | 1/1996 | Hassan | ................. | H04L 1/1877 340/7.22 |
| 7,512,787 B1 | * | 3/2009 | Viswanath | ............ | H04L 63/164 713/160 |
| 7,526,085 B1 | * | 4/2009 | Bong | .................... | H04L 63/061 380/37 |

(Continued)

FOREIGN PATENT DOCUMENTS

| EP | 3484119 A1 | 5/2019 |
| WO | WO 2019/120318 A2 | 6/2019 |

OTHER PUBLICATIONS

European Application No. 19179332.2, "Apparatus, Method and Computer Program", filed on Jun. 11, 2019, 30 pages.

(Continued)

*Primary Examiner* — Aravind K Moorthy
(74) *Attorney, Agent, or Firm* — ALSTON & BIRD LLP

(57) ABSTRACT

An apparatus and method are provided for monitoring a behavior of a communication device by using network controllers and network manager. The communication device is included in a network comprising a set of communication devices and a network manager allowing access by the communication devices to a communication network. A communication device may send a broadcast message to available network controllers and a network manager. The communication device may also send a service request to the network manager, the service request being routed by the network manager to a communication network and sent in broadcast by the network manager to the network controllers. Using the service request as the basis for a first report on behavior of the communication device, the communication device may additionally verify the first report by a report by network controllers based on the service request received from network manager.

19 Claims, 6 Drawing Sheets

(56) References Cited

U.S. PATENT DOCUMENTS

| | | | |
|---|---|---|---|
| 7,818,563 B1* | 10/2010 | Dwork | H04L 63/06 713/151 |
| 7,826,614 B1* | 11/2010 | Kaniz | H04L 9/0643 713/153 |
| 7,885,405 B1* | 2/2011 | Bong | H04L 9/0637 713/153 |
| 9,066,269 B1* | 6/2015 | Kumar | H04W 36/32 |
| 9,148,473 B1* | 9/2015 | Sharma | H04W 76/14 |
| 9,438,479 B1* | 9/2016 | Friedman | H04L 41/0869 |
| 10,325,079 B1 | 6/2019 | Vukich et al. | |
| 10,644,945 B2* | 5/2020 | Patton | H04L 41/0806 |
| 10,742,674 B1* | 8/2020 | McLinden | H04L 63/105 |
| 10,812,988 B1* | 10/2020 | Khan | H04L 41/22 |
| 2002/0184361 A1* | 12/2002 | Eden | H04L 41/22 709/224 |
| 2003/0026221 A1* | 2/2003 | Kotzin | H04W 40/02 370/329 |
| 2005/0015642 A1* | 1/2005 | Hannel | H04L 43/50 714/4.2 |
| 2006/0294305 A1* | 12/2006 | Ballard | G06F 11/0787 711/170 |
| 2007/0005746 A1* | 1/2007 | Roe | H04L 12/2809 709/223 |
| 2007/0198643 A1* | 8/2007 | Cope | G06Q 10/107 709/206 |
| 2008/0165962 A1* | 7/2008 | Kawano | H04N 21/4344 380/212 |
| 2008/0301332 A1* | 12/2008 | Butler | H04L 49/65 710/38 |
| 2010/0005297 A1* | 1/2010 | Ganesan | H04L 63/0823 713/169 |
| 2011/0047372 A1* | 2/2011 | Ganesan | H04L 63/0823 713/155 |
| 2011/0239265 A1* | 9/2011 | Hinic | H04N 21/242 725/116 |
| 2011/0306364 A1* | 12/2011 | Gossain | H04W 48/18 709/224 |
| 2011/0314145 A1* | 12/2011 | Raleigh | H04W 48/16 709/224 |
| 2013/0219482 A1* | 8/2013 | Brandt | H04L 63/08 709/201 |
| 2013/0297938 A1* | 11/2013 | Goto | H04L 9/0844 713/171 |
| 2014/0036677 A1* | 2/2014 | Draznin | H04W 28/0842 370/235 |
| 2014/0181892 A1* | 6/2014 | Von Bokern | H04L 63/0876 726/1 |
| 2014/0297834 A1* | 10/2014 | Tripathi | G06F 3/0647 709/224 |
| 2015/0009835 A1* | 1/2015 | Koponen | H04L 41/12 370/242 |
| 2015/0074741 A1* | 3/2015 | Janakiraman | H04L 63/08 709/225 |
| 2015/0100704 A1* | 4/2015 | Davie | H04L 12/46 709/238 |
| 2015/0312255 A1* | 10/2015 | Libonate | H04L 43/16 713/168 |
| 2016/0127197 A1* | 5/2016 | Yethadka | H04L 41/022 709/224 |
| 2016/0134650 A1* | 5/2016 | Farmer | H04L 63/1433 726/23 |
| 2016/0142336 A1* | 5/2016 | Udupi | H04L 67/63 709/226 |
| 2016/0241392 A1* | 8/2016 | Vandervort | H04L 9/0825 |
| 2017/0048308 A1* | 2/2017 | Qaisar | H04L 41/0895 |
| 2017/0093823 A1* | 3/2017 | Gopal | H04L 63/061 |
| 2017/0255508 A1* | 9/2017 | Lee | G06F 11/1016 |
| 2018/0077555 A1* | 3/2018 | Montemurro | H04W 48/16 |
| 2018/0089101 A1* | 3/2018 | Sternberg | G06F 12/109 |
| 2018/0101847 A1* | 4/2018 | Pisut, IV | G06Q 20/40145 |
| 2018/0101850 A1* | 4/2018 | Pisut, IV | G06Q 20/3227 |
| 2018/0124018 A1* | 5/2018 | Cascaval | G06F 21/554 |
| 2018/0167200 A1* | 6/2018 | High | A61B 5/0062 |
| 2018/0349242 A1* | 12/2018 | Mathews | H04W 4/06 |
| 2019/0012595 A1 | 1/2019 | Beser et al. | |
| 2019/0013996 A1* | 1/2019 | Thubert | H04L 67/63 |
| 2019/0028346 A1* | 1/2019 | Pallas | H04L 41/0866 |
| 2019/0058697 A1* | 2/2019 | Chang | H04L 63/168 |
| 2019/0129895 A1* | 5/2019 | Middleton | H04L 9/0637 |
| 2019/0251199 A1 | 8/2019 | Klianev | |
| 2019/0372834 A1* | 12/2019 | Patil | H04L 9/3263 |
| 2019/0373339 A1* | 12/2019 | Bradley | H04L 9/0637 |
| 2019/0373472 A1 | 12/2019 | Smith et al. | |
| 2019/0378192 A1* | 12/2019 | Fox | G06F 16/5866 |
| 2020/0028675 A1* | 1/2020 | Gancarz | G06Q 20/3829 |
| 2020/0029250 A1* | 1/2020 | Ibek | H04W 48/18 |
| 2020/0052961 A1* | 2/2020 | Soryal | H04L 41/0873 |
| 2020/0068642 A1* | 2/2020 | Ganu | H04W 4/02 |
| 2020/0084097 A1* | 3/2020 | Marks | G06Q 20/38215 |
| 2020/0137161 A1* | 4/2020 | Chintada | H04L 67/61 |
| 2020/0267628 A1* | 8/2020 | Chiang | H04W 8/12 |
| 2020/0310913 A1* | 10/2020 | Mondello | B60W 50/14 |
| 2020/0322227 A1* | 10/2020 | Janakiraman | H04L 41/147 |
| 2021/0012447 A1* | 1/2021 | Glaude | H04L 9/0643 |
| 2021/0081544 A1* | 3/2021 | Borlick | H03M 7/30 |
| 2021/0250395 A1* | 8/2021 | VanBlon | H04L 65/60 |
| 2021/0266220 A1* | 8/2021 | A | H04L 41/0226 |
| 2021/0288792 A1* | 9/2021 | Zeh | H04L 9/0841 |

OTHER PUBLICATIONS

Extended European Search Report received for corresponding European Patent Application No. 20174547.8, dated Oct. 26, 2020, 10 pages.

Lee et al., "Hardware-Based Online Self-Diagnosis for Faulty Device Identification in Large-Scale IoT Systems", IEEE/ACM Third International Conference on Internet-of-Things Design and Implementation (IoTDI), Apr. 17-20, 2018, pp. 96-104.

Signorini et al., "ADvISE: Anomaly Detection Tool for Blockchain Systems", IEEE World Congress on Services (SERVICES), Jul. 2-7, 2018, pp. 65-66.

Signorini et al., "BAD: A Blockchain Anomaly Detection Solution", arXiv, Jul. 12, 2018, 8 pages.

Yohan et al., "FOTB: A Secure Blockchain-based Firmware Update Framework for IoT Environment", International Journal of Information Security, vol. 19, Sep. 9, 2019, 22 pages.

Zhang et al., "Smart Contract-based Secure Model for Miner Registration and Block Validation", IEEE Access, Special Section on Artificial Intelligence in Cybersecurity, vol. 7, Sep. 2019, pp. 132087-132094.

\* cited by examiner

DEVICE MONITORING IN ACCESSING NETWORK

CROSS-REFERENCE TO RELATED APPLICATIONS

This application claims priority to European Patent Application No. 20174547.8, filed May 14, 2020, the entire contents of which are incorporated herein by reference. In addition, FIGS. 3-6 and additional text including additional text discussing FIGS. 3-6 have been newly added to this application.

FIELD OF INVENTION

The present subject matter generally relates to networks involving Internet of Things, for example. Furthermore, the present application relates to blockchains, distributed databases, distributed ledgers, and/or cryptographic protocols.

BACKGROUND

In some networks, the concept of device-class reputation can be used to autonomously onboard devices that comply with some security SLA (Service Level Agreement). The behavior of device-class could be written within a blockchain-based solution and shared on a global scale. To do so, devices are given a "terms of use" from their manufacturers which describe the device's expected behavior as designed at manufacturing time. As soon as a device requires to be connected to some network, the terms of use are uploaded to a network manager that will eventually (based on its reputation) onboard the new device within the network or any virtual slice created from the latter.

In an example of smart home, the network manager (for example an internet set-top box) can relay on backend servers (on the internet service providers' side) to report about good/bad behaviors of devices when matched against their terms of use. The final result is a tamper-proof and replicated device-class reputation history that the network manager can use to recognize possible malicious devices within their smart homes.

However, there is no way to verify if a behavior that has been reported by a network manager is the real behavior of a device belonging to it. Indeed, although some probabilistic approaches could be used to compare the report from one network manager to those reported by other network managers all over the world, there is no way to deterministically verify the integrity and truthfulness of a network manager's report since the network manager is acting as a man in the middle. Furthermore, in a different environment in which multiple network managers are available, there is still no solution for them to synchronize and cooperate on reporting about devices' behavior.

A single network manager is assumed trusty by design and this represents one among major open challenges in blockchain-based applications. Indeed, regardless of the size of the blockchain network and on how peers can participate or not (i.e. permissioned vs permissionless), having a single gateway to the outside world makes eclipse attacks easier. Indeed, by taking control of the Internet gateway, attackers could create fake blockchain transactions and/or nodes and force the victim to communicate with them only. As a result, the victim will be forced in trusting the malicious blockchain produced by the attacker as the mainstream one, thus vanishing almost all blockchain security properties.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for monitoring a behavior of a communication device on a blockchain, the communication device being included in a local network comprising a set of communication devices and a network manager allowing access by the set of communication devices to a telecommunication network, the method comprising in the communication device:

sending a broadcast message to the local network, the broadcast message including a query for available network controllers and network manager, a network controller being able to communicate with the blockchain, receiving information from available network controllers and the network manager, sending a service request to the network manager, the service request to be routed by the network manager to a telecommunication network and to be sent in broadcast by the network manager to the local network, the service request further serving as basis for a first report on behavior of the communication device to be sent by the network manager to the blockchain, establishing connection with each available network controller having received the service request in a broadcast message from the network manager, sending the service request previously sent to the network manager to each available network controller, a report based on the service request to be sent by each network controller to the blockchain for a validation of the first report Advantageously, by the usage of the blockchain technology and validation process of the first report, it can be avoided a malicious network manager to report fake/malicious behavior on communication devices. It allows the other blockchain nodes to accept transactions only if they are supported by the majority of neighbour devices being selected by the communication device itself as network controllers. Furthermore, it provides a solution that tackles the problem of identifying byzantine network managers within a multi-network manager environment such as a smart factory.

In an embodiment, the broadcast message sent by the communication device comprises a public key of the communication device and information from an available network controller is received with a public key of the available network controller, the public keys being used for encrypting communication between the communication device and the network controller.

In an embodiment, the broadcast message is sent by the communication device within a wireless range of the communication device.

In an embodiment, the broadcast message is sent by the communication device within a wireless range of the communication device.

In an embodiment, the first report is validated if the majority of the network controllers has sent a report with the same service request as the service request serving as basis for the first report.

In an embodiment, the reports sent to the blockchain by the network controllers are under the form of a smart contract to be executed by miners.

In another implementation, there is provided a method for monitoring a behavior of a communication device on a blockchain, the communication device being included in a local network comprising a set of communication devices and at least one network manager allowing access by the set of communication devices to a telecommunication network, the method comprising in the network manager receiving a broadcast message from a communication device, the broadcast message including a query for available network controllers and network manager, a network controller being able to communicate with the blockchain, sending information for available network manager to the communication device, receiving a service request from the communication device and routing the service request to a telecommunication network sending a first report on behavior of the communication device to the blockchain, the report containing the service request and a determined behavior of the communication device, sending a broadcast message to the local network, the broadcast message containing the service request, the broadcast message being used by available network controllers for retrieving the service request previously sent to the network manager by the communication device, the retrieved service request serving as basis for a report to be sent by each network controller to the blockchain for a validation of the first report.

In an embodiment, the behavior of the communication device is determined by analyzing the content of the service request with respect to an expected behavior.

In an embodiment, the behavior of the communication device is described by a manufacturer of the communication device.

In another implementation, there is provided a method for monitoring a behavior of a communication device on a blockchain, the communication device being included in a local network comprising a set of communication devices and a network manager allowing access by the set of communication devices to a telecommunication network, the method comprising in a network controller being able to communicate with the blockchain:

receiving a broadcast message from a communication device, the broadcast message including a query for available network controllers and network manager, sending information for available network controller to the communication device, receiving a broadcast message from the network manager, the broadcast message containing a service request received by the network manager from the communication device, the service request further serving as basis for a first report on behavior of the communication device to be sent by the network manager to the blockchain, establishing connection with the communication device, receiving the service request previously sent to the network manager from the communication device, sending a report based on the service request to the blockchain for a validation of the report.

In an embodiment, the network controller further receives a hash of the service request from the network manager and further receives a hash of the service request from the communication device, and network controller creates sends the report only if the hash sent by the communication device corresponds to the hash sent by the network manager.

In another implementation, there is provided an apparatus for monitoring a behavior of the apparatus on a blockchain, the apparatus being included in a local network comprising a set of communication devices and a network manager allowing access by the set of devices to a telecommunication network, the apparatus comprising:

at least one processor; and at least one memory including computer program code;

the at least one memory and the computer program code configured to, with the at least one processor, cause the apparatus at least to:

send a broadcast message to the local network, the broadcast message including a query for available network controllers and network manager, a network controller being able to communicate with the blockchain, receive information from available network controllers and the network manager, send a service request to the network manager, the service request to be routed by the network manager to a telecommunication network and to be sent in broadcast by the network manager to the local network, the service request further serving as basis for a first report on behavior of the apparatus to be sent by the network manager to the blockchain, establish connection with each available network controller having received the service request in a broadcast message from the network manager, send the service request previously sent to the network manager to each available network controller, a report based on the service request to be sent by each network controller to the blockchain for a validation of the first report.

In another implementation, there is provided an apparatus for monitoring a behavior of a communication device on a blockchain, the communication device being included in a local network comprising a set of communication devices and a network manager allowing access by the set of communication devices to a telecommunication network, the apparatus comprising:

one or more network interfaces to communicate with a blockchain network;

a processor coupled to the network interfaces and configured to execute one or more processes; and a memory configured to store a process executable by the processor, the process when executed operable to:

receive a broadcast message from a communication device, the broadcast message including a query for available network controllers and network manager, a network controller being able to communicate with the blockchain, send information for available network manager to the communication device, receive a service request from the communication device and routing the service request to a telecommunication network send a first report on behavior of the communication device to the blockchain, the report containing the service request and a determined behavior of the communication device, send a broadcast message to the local network, the broadcast message containing the service request, the broadcast message being used by available network controllers for retrieving the service request previously sent to the network manager by the communication device, the retrieved service request serving as basis for a report to be sent by each network controller to the blockchain for a validation of the first report.

In another implementation, there is provided an apparatus for monitoring a behavior of a communication device on a blockchain, the communication device being included in a local network comprising a set of communication devices and a network manager allowing access by the set of communication devices to a telecommunication network, the apparatus being able to communicate with the blockchain and comprising:

one or more network interfaces to communicate with a blockchain network;

a processor coupled to the network interfaces and configured to execute one or more processes; and a memory configured to store a process executable by the processor, the process when executed operable to:

receive a broadcast message from a communication device, the broadcast message including a query for available network controllers and network manager, send information for available network controller to the communication device, receive a broadcast message from the network manager, the broadcast message containing a service request received by the network manager from the communication device, the service request further serving as basis for a first report on behavior of the communication device to be sent by the network manager to the blockchain, establish connection with the communication device, receive the service request previously sent to the network manager from the communication device, send a report based on the service request to the blockchain for a validation of the first report.

According to an aspect, there is provided a computer readable medium comprising program instructions stored thereon for performing at least one of the above methods According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In another implementation, there is provided a system for monitoring a behavior of a communication device on a blockchain, the communication device being included in a local network comprising a set of communication devices and a network manager allowing access by the set of devices to a telecommunication network, the system comprising:

the communication device for sending a broadcast message to the local network, the broadcast message including a query for available network controllers and network manager, a network controller being able to communicate with the blockchain, the communication device for receiving information from available network controllers and the network manager, the communication device for sending a service request to the network manager, the network manager for routing the service request to a telecommunication network and to be sent in broadcast by the network manager to the local network, the network manager for sending a first report on behavior of the communication device to the blockchain, the report containing the service request and a determined behavior of the communication device, the network manager for sending a broadcast message to the local network, the broadcast message containing the service request, the communication device for establishing connection with each available network controller having received the service request in a broadcast message from the network manager, the communication device for sending the service request previously sent to the network manager to each available network controller, a report based on the service request to be sent by each network controller to the blockchain for a validation of the first report.

In another implementation, there is provided a system for monitoring a behavior of a communication device on a blockchain, the communication device being included in a local network comprising a set of communication devices and a network manager allowing access by the set of devices to a telecommunication network, the system comprising:

the communication device for sending a broadcast message to the local network, the broadcast message including a query for available network controllers and network manager, a network controller being able to communicate with the blockchain, the communication device for receiving information from available network controllers and the network manager, the communication device for sending a service request to the network manager, the service request to be routed by the network manager to a telecommunication network and the service request further serving as basis for a first report on behavior of the communication device to be sent by the network manager to the blockchain, a network controller for receiving a broadcast message from the network manager, the broadcast message containing the service request received by the network manager from the communication device, the network controller for establishing connection with the communication device, the network controller for receiving the service request previously sent to the network manager from the communication device, the network controller for sending a report based on the service request to the blockchain for a validation of the first report.

In another implementation, there is provided a system for monitoring a behavior of a communication device on a blockchain, the communication device being included in a local network comprising a set of communication devices and a network manager allowing access by the set of devices to a telecommunication network, the system comprising:

the network manager and a network controller for receiving a broadcast message from a communication device, the broadcast message including a query for available network controllers and network manager, a network controller being able to communicate with the blockchain, the network manager for sending information for available network manager to the communication device and the network controller for sending information for available network controller to the communication device, the network manager for receiving a service request from the communication device, the network manager for routing the service request to a telecommunication network and to be sent in broadcast by the network manager to the local network, the network manager for sending a first report on behavior of the communication device to the blockchain, the report containing the service request and a determined behavior of the communication device, the network manager for sending a broadcast message to the local network, the broadcast message containing the service request, the network controller for establishing connection with the communication device, the network controller for receiving the service request previously sent to the network manager from the communication device, the network controller for sending a report based on the service request to the blockchain for a validation of the first report.

In one embodiment, an apparatus is provided that includes at least one processor and at least one memory including computer program code with the at least one memory and the computer program code configured to, with the at least one processor, cause the apparatus at least to send a message including a query for an available network controller and network. The apparatus is also caused to receive information from the available network controller and the network manager and to exchange cryptographic keys between the apparatus, the available network controller and the network manager.

The apparatus of an example embodiment is further configured to cause to send a service request via the network manager to a communications network. In the message to the network controller, the service request serves as the basis for a first report on behavior of the apparatus to be sent by the network manager. The apparatus of this example may be further configured to cause to store the sent service request and a hash of the service request for future validation. The apparatus of an example embodiment may be further configured to cause to establish connection with the available network controller having received the service request in the message from the network manager and to send the stored service request previously sent to the network manager to the available network controller, for the network controller to create a report based on the service request to be sent by the network controller for a validation of the first report by a blockchain network. The apparatus of an example embodiment is further configured to cause to send the stored hash of the service request in addition the service request for network controller to create a report for the validation of the first report.

The message sent by the apparatus of an example embodiment includes a public key (CD-Pk) of the apparatus and information from the available network controller is received with a public key (Pk-N) of the available network controllers. The public keys are used for encrypting communication between the apparatus and the network controller. The message is sent by the apparatus of an example embodiment within a wireless range of the apparatus. In an embodiment in which the information received includes information for a plurality of available network controllers, the first report may be validated if a majority of the network controllers have sent a report with the same service request as the service request serving as basis for the first report. The apparatus of an example embodiment may be further configured to cause to verify the apparatus to be used if validation is supported by a required number of the network controllers. In an example embodiment, the apparatus is further configured to cause to select the network manager and the network controller automatically using predetermined parameters or select the network manager and the network controller shown in a user interface of the apparatus.

In another example embodiment, an apparatus is provided that includes a processor coupled to one or more network interfaces and configured to execute one or more processes and a memory configured to store a process executable by the processor with the process when executed operable to receive a message from a communication device. The message includes a query for available network controllers and network manager. The process is also operable to send information for the available network manager and the available network controllers to the communication device and to receive a service request from the communication device and route the service request to a communication network. The apparatus is further operable to determine a behavior of the communication device and to generate a first report on the behavior of the communication device. The report contains the service request and the determined behavior of the communication device. The apparatus is additionally operable to send a message to the available network controllers containing the service request for retrieving the service request previously sent to the network manager by the communication device. The retrieved service request serves as the basis for a report to be generated by each network controller for a validation of the first report.

The message may contain a hash of the service request and a query to report the service request received from the communication device. In an example embodiment, the behavior of the communication device is determined by analyzing the content of the service request with respect to an expected behavior. For example, the behavior of the communication device may be described by a manufacturer of the communication device.

In a further example embodiment, an apparatus is provided that includes a processor coupled to network interfaces and configured to execute one or more processes and a memory configured to store a process executable by the processor with the process when executed operable to receive a message from a communication device. The message includes a query for available network controllers and network manager. The process is also operable to send information of the available network controllers and the network manager to the communication device and to receive a message from the network manager. The message contains a service request received by the network manager from the communication device. The service request further serves as a basis for a first report on behavior of the communication device to be sent by the network manager. The process is further operable to establish connection with the communication device, to receive the service request previously sent to the network manager from the communication device, and to generate a report based on the service request for a validation of the first report by a broadcast network.

The apparatus of an example embodiment is further configured to receive a hash of the service request from the network manager and to further receive a hash of the service request from the communication device. In this example embodiment, the network controller creates the report if the hash sent by the communication device corresponds to the hash sent by the network manager. If the hash of the service request received from the communication device and the network manager are not the same, the request may be rejected by the network controller. In an example embodiment, the report sent to a blockchain by the network controller is in the form of a smart contract to be executed by miners. The apparatus of an example embodiment is further configured to cause to verify the network manager if the report is supported by a required number of the network controllers. In an example embodiment, the apparatus is further configured to cause a query for the service request previously sent to the network manager from the communication device.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
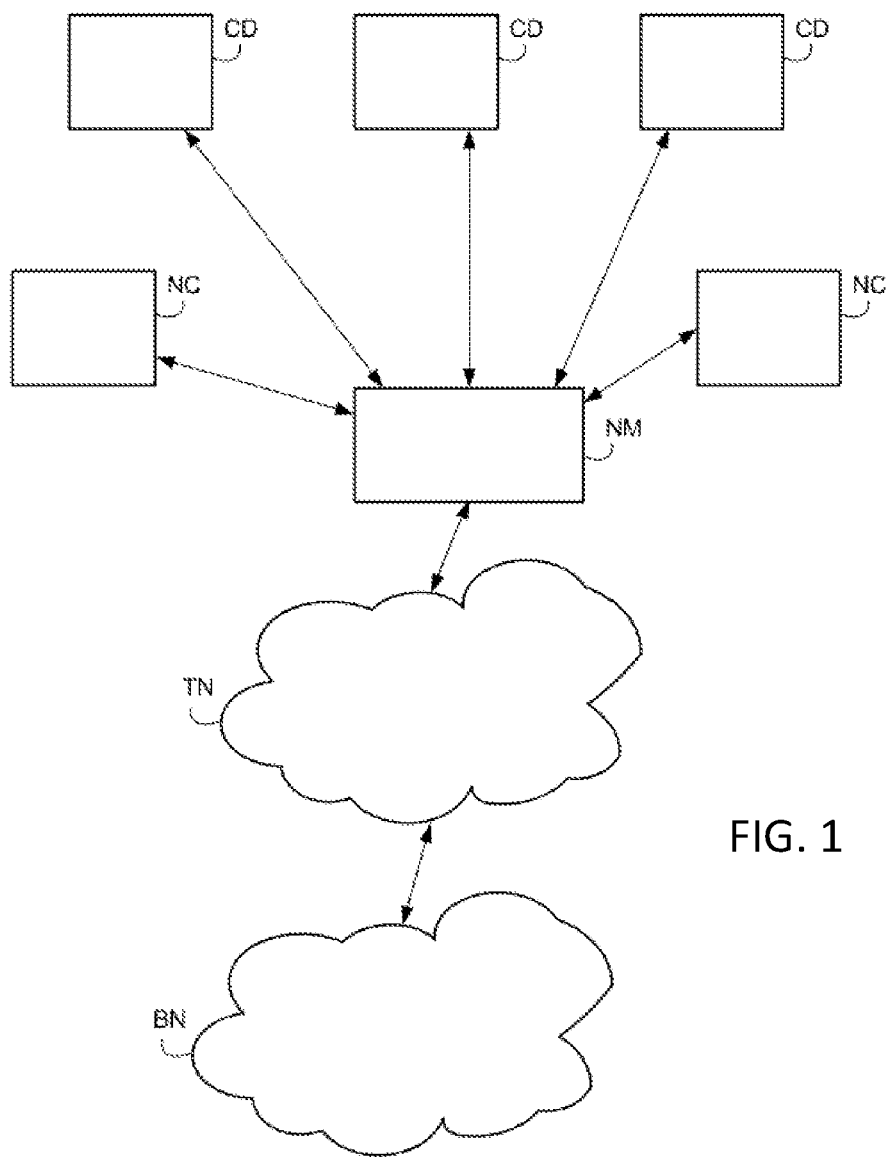
FIG. 1 illustrates a schematic block diagram of a communication system according to one embodiment of the invention.

FIG. 1 illustrates a network scenario in accordance with at least some embodiments of the present invention. As shown in FIG. 1, the network scenario may comprise a set of communication devices CD. Some of the communication devices may have the required functionality to act as a network manager NM or as a network controller NC.

A communication device CD can be a corporate, authority, and/or user device, such as a server device, a desktop/tablet/laptop computer, smartphone, a machine-to-machine (M2M) device, a set-top box or other suitable electronic device. The communication devices CD can be virtual machines, for example implementing compute and storage functions. In an IoT environment, a communication devices CD can be any low-powered device such as a light-bulb.

A communication device CD may need to use a service via a connection to a network (like a home network) that is controlled by a network manager. To that end, the communication device CD is able to send a request related to this service to the network manager that allows the service to be performed.

A communication device CD can be considered as a network manager NM if it has the required functionality. A network manager NM is responsible to "bind" with a given communication device (i.e. to give connections, either intranet or internet ones) and to report on a blockchain network BN about its current behaviour as compared to a reference behaviour. The reference behaviour is signed by the manufacturer of the given communication device and shared with the network manager NM during the "bind" process. The reference behaviour related to a communication device describes how the communication device should behave. For example, a part of the reference behaviour could be "TERM=connect to French IPs". Based on TERM, a network manager can then recognize if the communication device is good or bad behaving. In this example, if the communication device only connects to French IPs it will good-behave, and if it connects to other IPs from other countries then it will bad-behave.

In the network scenario, only one network manager NM can be chosen by a communication device during a setup phase with a "bind" process and a network manager NM can be counted also as a network controller as explained later. The network manager NM allows communication devices to access a telecommunication network TN. For example, a network manager NM is an internet gateway.

In one embodiment, the "bind" process is the process with which the communication device allows a network manager to start reporting about the behaviour of the communication device. This "bind" process can rely on a request sent by the communication device CD to the network manager NM to join the blockchain network.

A network controller NC does not act as gateway/proxy for the internet (data) connection, unlike a network manager. The role of a network controller is to review previous requests being sent to the network manager NM and to upload them to a blockchain as witnesses of what happened. In one embodiment of the network scenario, it is assumed that a communication device should have at least 2f+1 network manager and network controllers NC in order to defend against f malicious network entities (network manager and network controllers).

The network manager and the network controllers are equipped with an application able to connect to the blockchain network, in order to report a content of a request of a communication device.

Data packets (e.g., traffic and/or messages sent between the network managers) may be exchanged among the network manager, the network controllers and the blockchain network BN using predefined network communication protocols such as certain known wired protocols, wireless protocols, or other shared-media protocols where appropriate. In this context, a protocol consists of a set of rules defining how the nodes interact with each other.

Innovative decentralized data storage solutions, such as blockchains, enable to provide provenance and also to avoid the need to rely on third parties to regulate information and data systems. In addition, blockchain platforms can host "smart contracts" which could replace established methods based on human witnesses with logical software-implemented protocols.

"Smart contracts" may be defined as computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

A blockchain network BN relies on a blockchain architecture that is a replicated computing architecture where every network node executes and records the same transactions in the same order. Only one transaction at a time is globally accepted and all those transactions create the blockchain data-set which is kept replicated across the whole network. This is achieved without the need of a central authority since each and every transaction (as well as its order within the global set of transactions) needs to be accepted and broadcasted by a fraction of the network (each blockchain implementation has its own fraction's size). The blockchains can work in different ways, as well as in different scales.

The nodes of a blockchain network may comprise corporate, authority, and/or user devices, such as a server, a desktop/tablet/laptop computer, smartphone or other suitable electronic device. The system may comprise an administrator or management node, a relay or other kind of intermediate device for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

The blockchain state information shared by the nodes may store all the transactions and history carried out in the network. The blockchain state information is stored in or as a blockchain ledger. Each node comprises the ledger whose content is in sync with other ledgers. The nodes may validate and commit transactions in order to reach consensus. Each node may have their own copy of the ledger and is permission-controlled, so participants see only appropriate transactions. Application of blockchain technology and the ledger enable a way to track the unique history of transactions by the individual nodes in the network. A network manager provides a service of reporting on the blockchain a behavior of communication devices for which a bind process has been established.

A blockchain begins with the creation of a 'genesis' block. Each subsequent block then includes a hash of the previous block in the blockchain. This has two effects: 1.) modifying an existing block would also require regenerating each block after it, which is highly impractical from a computational standpoint and prevents malicious changes and 2.) the hashing mechanism provides an ordering to the blocks that traces all the way back to the genesis block, allowing devices to track changes in the system. The actual data content of the blocks can also vary. For example, the data in the blocks typically include a listing of exchanges/transactions and can include any information.

A block of the blockchain may comprise at least header fields and a set of transactions that forms an actual transaction data of the block. In terms of the present invention, the transactions may comprise top hash entries, optionally with their timestamps, provided for storage into the block chain. The transactions may also comprise different kinds of transactions, as the block chain need not be dedicated to one single type of transaction.

Blockchain systems typically implement a peer-to-peer system based on some combination of encryption, consensus algorithms, and proof-of-X, where X is some aspect that is difficult to consolidate across the network, such as proof-of-work, proof-of-stake, proof-of-storage, etc. Typically, those actors on a network having proof-of-X arrive at a consensus regarding the validation of peer-to-peer transactions. Some private blockchains do not implement proof-of-X consensus, e.g., where the computing hardware implementing the blockchain is controlled by trusted parties. Chained cryptographic operations tie a sequence of such transactions into a chain that once validated, is typically prohibitively computationally expensive to falsify.

The blockchain network can be public or private. A public blockchain is a blockchain that anyone can read, send transactions and expect to see them included if they are valid, and anyone can participate in a consensus process for determining what blocks get added to the chain. Different kinds of private blockchain may be distinguished. A fully private blockchain is a blockchain where write permissions are kept to one organization. Read permissions may be public or restricted to certain participants. A consortium blockchain is a blockchain where a consensus process is controlled by a pre-selected set of nodes, for example, a consortium of 15 financial institutions, each of which operates a node and of which 10 must sign every block in order for the block to be valid. The right to read the blockchain may be public or restricted to the participants. A semi-private blockchain is run by a single company who grants access to any user who qualifies, and it typically targets business-to-business users. Examples of semi-private blockchains could include ones for government entities for record-keeping, land titles, public records, etc.

The network manager or the network controller is an apparatus that may be any suitable physical hardware configuration such as: a network gateway, one or more server(s), blades consisting of components such as processor, memory, network interfaces or storage devices. In some of these embodiments, the apparatus may include cloud network resources that are remote from each other.

In some embodiments, the apparatus may be a virtual machine. In some of these embodiments, the virtual machine may include components from different machines or be geographically dispersed. The apparatus may comprise one or more network interfaces (e.g., wired, wireless, etc.), at least one processor, and a memory interconnected by a system bus and powered by a power source (e.g., one or more batteries or other charge storage devices, a power line, etc.).

The network interface(s) contain the mechanical, electrical, and signaling circuitry for communicating data over links coupled to the blockchain network. The network interfaces may be configured to transmit and/or receive data using a variety of different communication protocols according to the blockchain network.

The memory comprises a plurality of storage locations that are addressable by the processor and the network interfaces for storing software programs and data structures associated with the embodiments described herein. The processor may comprise hardware elements or hardware logic adapted to execute software programs. An operating system, portions of which are typically resident in memory and executed by the processor, functionally organizes the device by, inter alia, invoking operations in support of software processes and/or services executing on the apparatus.

Figure 2:
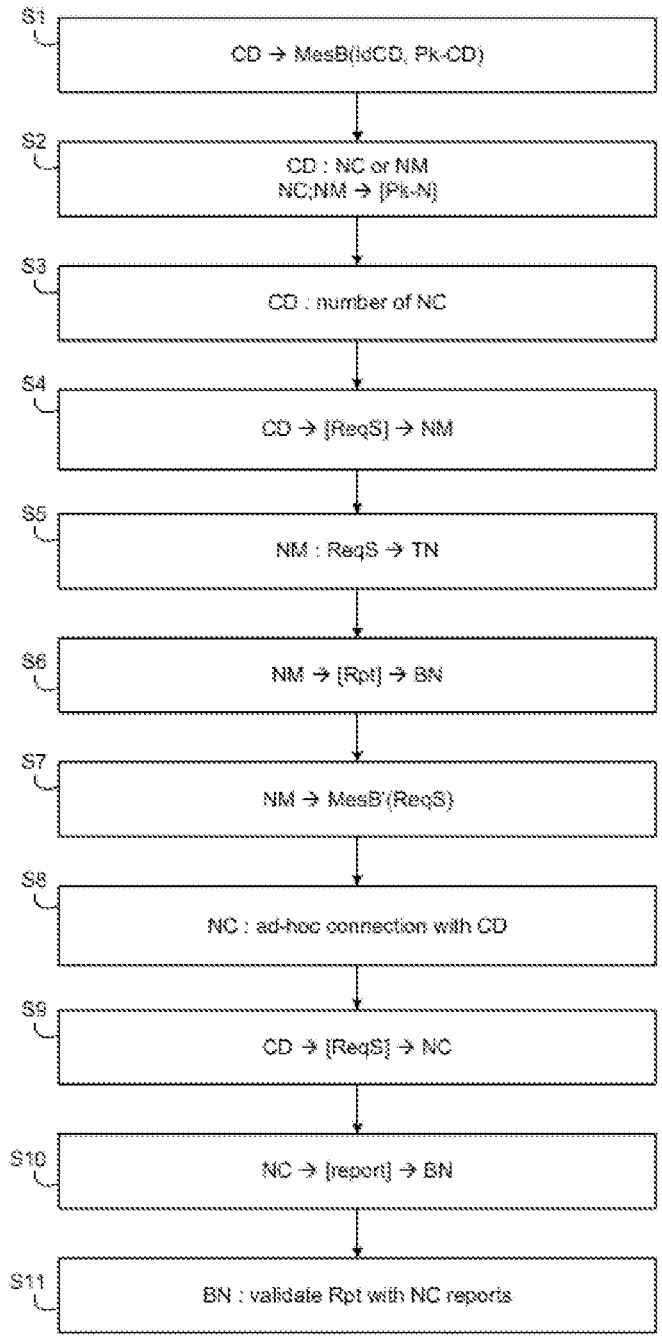
FIG. 2 illustrates a flow chart illustrating a method in accordance with at least some embodiments of the present invention.

With reference to FIG. 2, a method monitoring behavior of a communication device according to one embodiment of the invention comprises steps S1 to S11. A communication network, like a local network, comprises a set of communication devices, including at least one communication device acting as a network manager.

In a setup process corresponding to steps S1 and S2, a communication device willing to connect to the Internet via a network manager for a given service sends a broadcast message to all communication devices within wireless distance advertising its presence. With all active communication devices that reply, a standard key-pair exchange protocol takes place for the communication devices to communicate in a secure/private way.

In step S1, the communication device CD sends a broadcast message MesB within a wireless range of the communication device CD. The broadcast message MesB contains an identifier IdCD of the communication device, a public key Pk-CD of the communication device and a query for available network controller and network manager. For example, the identifier IdCD of the communication device is a MAC address of the communication device.

In step S2, when the other communication devices are contacted by the communication device CD, i.e. when they receive the broadcast message, they choose whether they want to be a network controller NC or a network manager NM or nothing by sending such information to the communication device. Such other communication device can be a network controller or network manager if it has the required functionality and an authorization (for example via an agreement of the manufacturer of such other communication device).

At the initiative of said other communication device, session cryptographic keys are exchanged between the communication device and each of said other communication devices being available as network manager or network controller. By receiving information that said other communication devices are available as network manager or network controller, the communication device further receives the public key Pk-N of said other communication devices. For the sharing of such cryptographic keys, a standard key-pair exchange protocol can take place for the devices to communicate in a secure/private way, being able to encrypt all future messages.

When a contacted device chooses to be a network controller, it exchanges the key-pair with the communication device CD for future communications and it means it will behave like a network controller for said communication device CD by means of the identifier IdCD of the communication device and the exchanged cryptographic keys.

In step S3, the communication device selects one network manager if there are many network managers and a number of network controllers. In one embodiment, the communication device CD knows that there are N devices within the same network (this can be done via PING or other HELLO protocols), the communication device CD can decide to select 2f+1 devices as network manager and network controllers among said N devices, f being any number such that "f<=N/2−1". This number f is set to defend against f malicious devices.

In another embodiment, that could be considered for a best practice scenario, the communication device can select the maximum number of network controllers among the other communication devices having replied to the broadcast message. In another embodiment, that could be considered for a worst case scenario the communication device, the communication device can select at least 3 network controllers among the other communication devices having replied to the broadcast message. In one example CD may select the NM and NCs automatically using predetermined parameters or by selecting NM and NCs in a list shown in user interface of CD.

In another embodiment, the number f or the number of chosen network controllers can be decided/defined in many ways. It could be the user/owner of the communication device CD that selects said number, for example via an application on the communication device CD or it can be decided by a specific protocol or even by the manufacture of the communication device. As an example, the manufacturer could sell a set of communication devices CD that support "f=3" and those devices will only start to work when they receive "2f+1=7" replies from other communication devices acting as network controllers. In another embodiment, if such number is not pre-defined, the communication device CD can select to the majority of communication devices acting as network controllers as to provide the best service in terms of security. This configuration can remain fixed or changed according to a policy of the communication device. The more the configuration changes and the more devices are selected as network controllers, the more secure is the protocol.

In step S4, the communication device CD sends a service request ReqS to the network manager NM. For example, the service request is a data-driven logical request related to the upload/download of data to/from the Internet, a socket access, a firmware upgrade or any service operable by the communication device. Furthermore, the communication device CD caches the sent service request and the hash of the service request for future validation use. The service request ReqS is encrypted and signed to guarantee integrity and authenticity.

In step S5, the network manager NM receives the service request ReqS and performs the service related to the service request ReqS. As the network manager NM has the functionality to route the traffic, it is able to analyze the content of the service request and to allow the communication device to access a telecommunication network by routing the service request to the telecommunication network TN. The telecommunication network may further comprise one or more other communications networks, like Internet, for example.

The network manager NM stores a copy of the service request to be sent later to other network controllers. It is assumed that the copy of the service request has the same content as the service request, eventually adapted to a desired format.

In step S6, the network manager NM analyzes the content of the service request and determines the behavior of the communication device in view of an expected behavior.

In some embodiments, the network manager NM can retrieve (or has already retrieved) a set of specifications of the communication device by interrogating an entity able to provide information about the expected behavior of the communication device, like the manufacturer of the communication device. The expected behavior can be described in a document of type terms of use.

The determined behavior is for example a good behavior or a bad behavior in view of an interpretation of the content of the service request against the terms of use of the communication device, the determined behavior contributing to the evolution of the reputation of the communication device.

The network manager NM sends a first report Rpt to the blockchain network BN, the report containing the content of the service request and the determined behavior of the communication device. Such first report Rpt about behavior is not final yet (not written within the blockchain) and has to be validated later (in order to be written in the blockchain) by miners of the blockchain network by means of other reports.

In step S7, the network manager NM sends a broadcast message MesB' to all communication devices in the local network (communication devices acting like network controller or not). The broadcast message MesB' contains the copy of the service request ReqS, the hash of the service request and a query to report the service request retrieved from the communication device in order to validate the behavior of the communication device.

In step S8, each network controller NC that has received the broadcast message MesB' establishes an ad-hoc connection with the communication device CD, which is identified for example by means of the identifier IdCD of the communication device. The ad-hoc connection is for example a direct WiFi connection. The ad-hoc connection is encrypted by means of the public keys of the communication device and of the network controller.

In step S9, each network controller NC asks the communication device CD for the latest request being sent to the network manager, i.e. the service request ReqS sent in step S4.

The communication device CD retrieves the service request ReqS and the hash of the service request previously stored in cache. The communication device CD sends the service request ReqS and the hash of the service request to each network controller NC having an ad-hoc connection with the communication device. The cached requests are hash-sized which means a few kilobytes and they may be deleted as soon as the request is validated (no reason to keep a history of past, accepted, requests). As such, any "smart" IoT device sold nowadays could make it. A program or application may be used to delete cached request in IoT device.

In step S10, each network controller NC creates its own report based on the service request as blockchain transaction and sends it to the blockchain network BN. In one embodiment, the network controller NC creates its own report only if the hash sent by the communication device corresponds to the hash sent by the network manager. The hash received by the CD must be the same received by the NM. If not, the request is rejected from the NC and eventually also by the blockchain since the NM won't be supported by any NC.

The hash identifies the service request being created by the communication device but not the communication device itself. In one example, the CD's identity for privacy reasons is not provided, but information on the device "class" such as webcams, temperature sensors, smoke/gas sensors, etc., for example, is provided. In one embodiment, this is needed to verify if the communication device and the network manager are in agreement with the service request made by the communication device CD. Two cases are possible: 1) the hashes being sent by the communication device and the network manager match, then they agree on the service request of the communication device and the report transaction can be created by the network controllers as well or 2) the hashes does not match, which means that either the communication device is denying the service request made to the network manager or that the network manager is forging some fake requests on behalf of the communication device.

If the hashes do not match, the service request is not forwarded by the network controller and as such it won't be accepted within the blockchain. To reach consensus for example in blockchain, votes are needed to agree. In this regard, the number of network controllers exceeds the number of network managers in an example embodiment such that the votes of the network controllers will control the validation process to the exclusion of the network manager(s) if the network controllers vote in a uniform manner. If the NCs do not forward the request due to a mismatch in the hash, the NM vote will be the only one and the consensus will not be reached, for example.

The reports sent to the blockchain network BN are blockchain transactions and can be under the form of a smart contract to be executed by miners of the blockchain. The content of reports sent by the network controllers are in the same format as the first report sent by the network manager, i.e. should correspond to the content of the service request, except that the network manager adds the determined behavior of the communication device (as the network manager has the terms of use of the communication device and the network controllers do not have them).

When sending a request of service first time the new communication device is validated by using the terms of use e.g. at least manufacturer's settings (address domain like location of server is in a country or region or territory) provided to NM, for example. Further network manager may broadcast that information to network controllers. In one example the terms of use may be stored in the NM and they are used for the service requests. Update of terms may be possible through software updates for change of the valid country or region or territory, for example.

In step S11, the report transactions are executed on the blockchain network BN according to the type of blockchain and to a specific consensus in order to validate or invalidate the first report Rpt previously sent by the network manager.

The network manager NM and the network controllers NCs send the reports to the same entity, like a validation entity. The entity may have the same network address. The network manager and the network controllers may have their IDs known by the entity. The reports may be identified by identifier IdCD of the communication device and time of service requests, or any other ways, like using identifiers of the network manager NM and the network controllers NCs or any combination of these, for example. The entity may be blockchain network BN as described in this patent application as an example.

Figure 3:
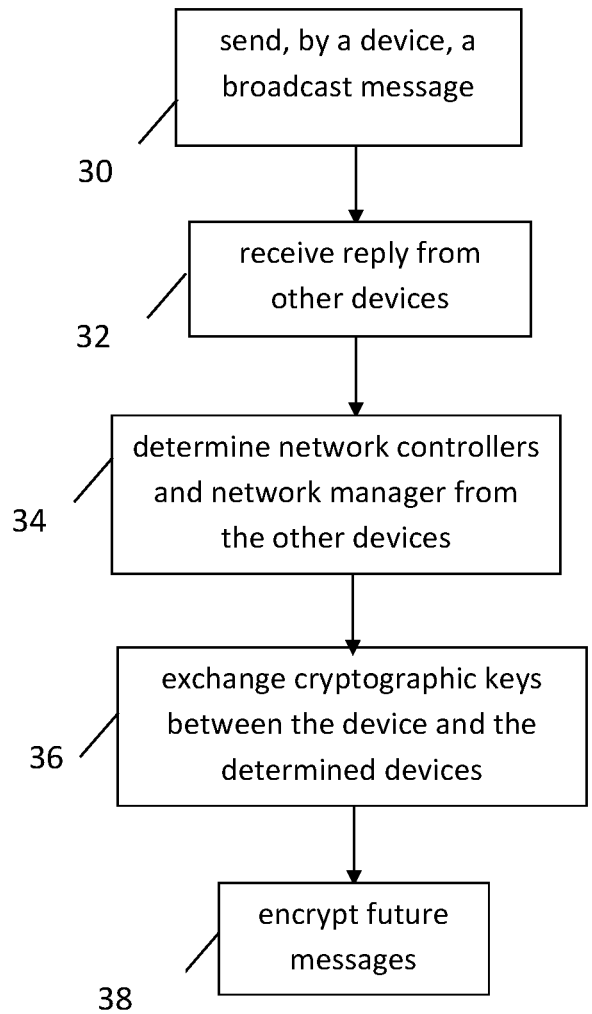
FIG. 3 illustrates a flow chart of a method implemented by a communication device in accordance with at least some examples.

In FIG. 3 a flow chart of a method implemented by a communication device, in accordance with at least some examples, is illustrated. The flow chart begins at 30. The communication device is configured to send a broadcast message. The communication device sends it, at least, to get knowledge of the other devices in the local network.

The flow chart continues at 32, where communication device receives reply/ies from other devices, such as from one or a plurality of network controllers and from a network manager.

At 34 the devices that function as network controllers and as a network manager are determined from the reply/ies from the other devices.

At 36 cryptographic keys are exchanged between the device and the determined devices, like the network controllers and the network manager.

At 38 the devices encrypt future messages. For cryptographic keys, for example, a standard key-pair exchange protocol can take place for the communication device, networks controllers and network manager to communicate in a secure/private way, being able to encrypt all future messages.

Figure 4:
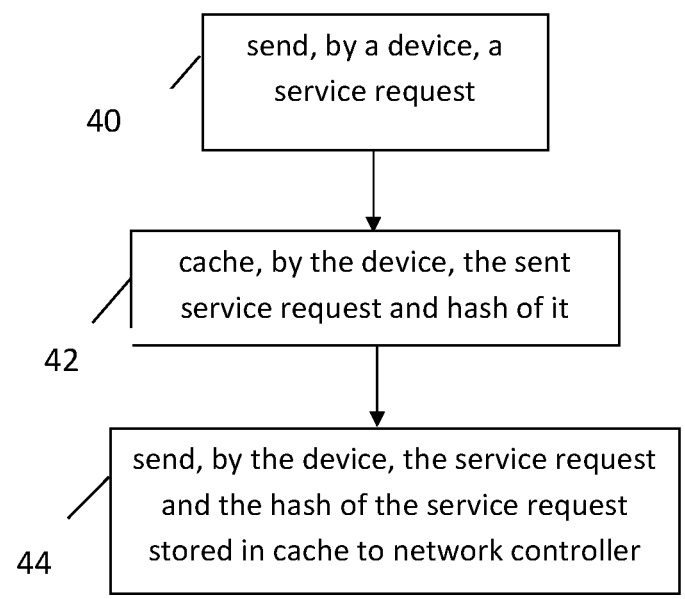
FIG. 4 illustrates a flow chart illustrating a method implemented by a communication device in accordance with at least some examples.

In FIG. 4 a flow chart, illustrating a method implemented by a communication device in accordance with at least some examples, is illustrated.

The flow chart begins at 40 where the communication device is configured to send a service request depicted as ReqS, as one example.

The flow chart continues at 42 where the communication device may cache, or store information on the sent service request and the hash of it.

At 44 the device sends information on the service request and the hash of the service request stored in cache to the determined network controllers.

Figure 5:
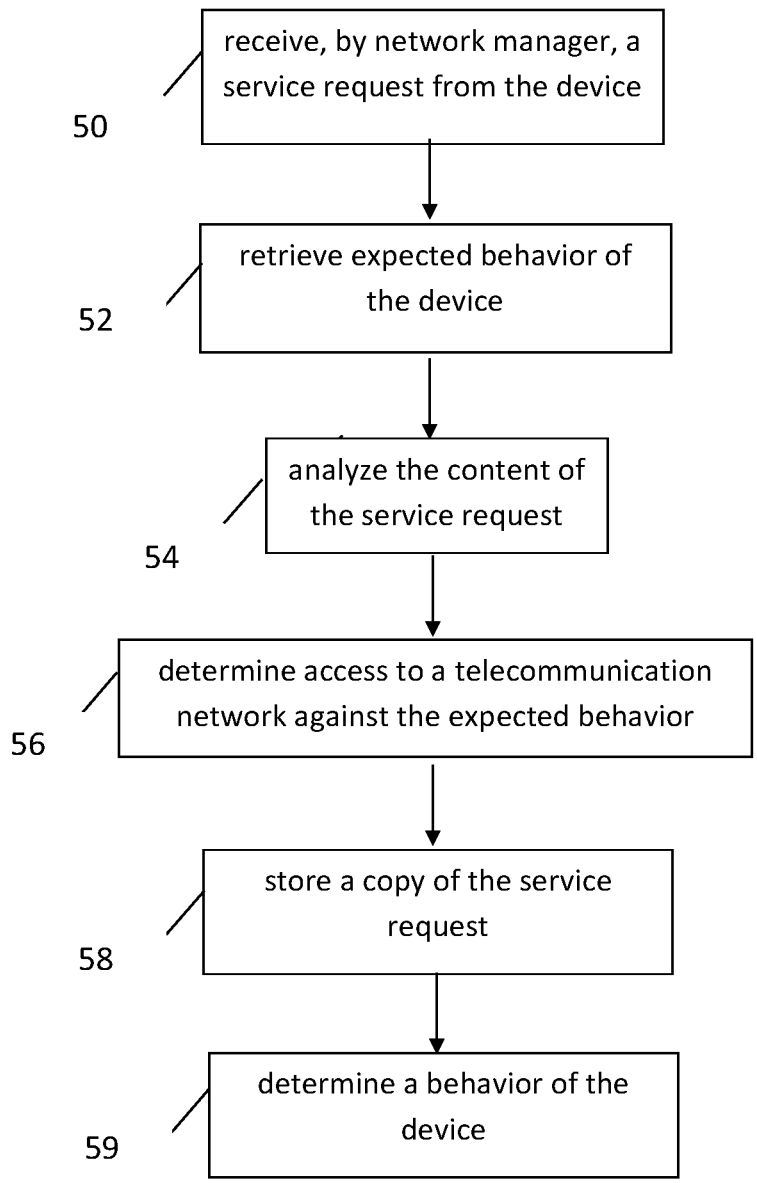
FIG. 5 illustrates a flow chart illustrating a method implemented by a network manager in accordance with at least some examples.

FIG. 5 a flow chart, illustrating a method implemented by a network manager in accordance with at least some examples, is illustrated.

Flow chart begins at 50. The network manager receives a service request from the communication device.

At 52 The network manager retrieves expected behavior of the communication device.

Flow chart continues at 54 where the network manager analyzes the content of the service request.

At 56 the access to a telecommunication network is determined and compared against the expected behavior of the communication device. The network manager may be configured to receive an updated version of the expected behavior and then the updated version will become the expected behavior.

At 58 the network manager is configured to store a copy of information on the service request received from the communication device.

At 59 the network manager determines a behavior of the communication device. The behavior may be determined as good or bad. If bad, the service request may be determined to be cancelled, for example. The network manager may generate first report for validation.

Figure 6:
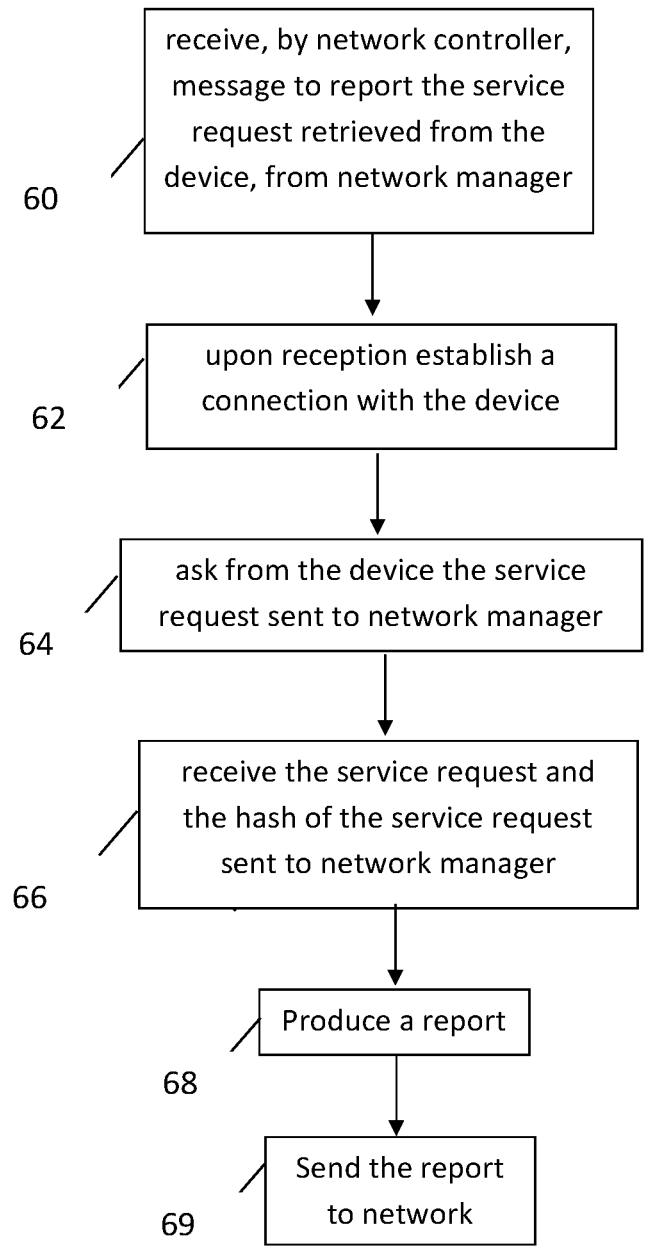
FIG. 6 illustrates a flow chart illustrating a method implemented by a network controller in accordance with at least some examples.

FIG. 6 illustrates a flow chart illustrating a method implemented by a network controller accordance with at least some examples.

The flow chart begins at 60 where the network controller is configured to receive from the network manager a message to report the service request retrieved from the communication device.

At 62 upon reception of the message, the network controller is configured to establish a connection with the communication device.

At 64, the network controller is configured to ask from the communication device information on the service request sent to the network manager.

At 66, the network controller is configured to receive from the communication device information on the service request and the hash of the service request sent to the network manager.

At 68, the network controller may produce a report. The report may comprise the result of comparison of the information received from the communication device and the network manager. The determined network controllers are configured to operate similarly.

At 69, the network controller is configured to send the report for validation. The first report and the report/s may be sent to same entity and validated there.

In a general manner, if the first report Rpt is validated, it yields to the creation of a transaction written in a block of the blockchain. In one embodiment, said block contains a set of reports about the communication device and is valid if and only if for the communication device associated to a specific first report, there are at least X number of transactions that confirm its validity, where X is the majority of the network controllers and the network manager communicating with the communication device CD.

As such, for each assessed communication device, there can be a set $C_i$ of network controllers where $C_i=\{C_1^i, C_2^i, \ldots, C_k^i\}$. The "majority of transactions supporting a specific behavior" is then expressed by the following formula $Maj=|C_i/2|$.

By the usage of the blockchain technology and this new protocol for validating the first reports, it can be avoided malicious network managers to report fake/malicious behavior on communication devices. Indeed, since both the network manager and network controllers are providing feedbacks on the communication device's requests, if the majority of them is honest (an important assumption for any blockchain-based solution) then malicious, or fake or other reports, supported by the minority of network manager or network controllers, will be discarded.

In an illustrative example described thereinafter, whenever an IoT device (or any other dumb device not able to manage the blockchain itself) wants to be part of a blockchain ecosystem/solution, it has to rely on somebody else for the creation of blockchain transactions. In this case, the IoT devices rely on a network manager (i.e. a modem/router) for the creation and broadcast of blockchain transactions, as the IoT device would not be able to do that themselves. This has the big advantage of making low-powered dumb devices capable of joining a blockchain solution but it also has the big drawback of putting all the trust in the network manager. Indeed, even if the IoT device (like the communication device CD in this case) is behaving as expected, a compromised network manager could report of it acting in a malicious way. The above issue is due to the fact that nowadays there is no way for other blockchain nodes to verify if the transactions being created by said network manager are trusted or not. Indeed, they are not directly connected to the IoT device and cannot verify what it is doing. To solve this issue, a network scenario according to one embodiment does not have one single network manager but it is required that each transaction (related to service request from an IoT device) is also reported by many network controllers. As such, other network managers or backend systems can verify if each transaction is supported by a required number of network controllers.

In an illustrative example described thereinafter, a network scenario comprises a smart TV, a security camera, a laptop and a set-top box (acting as modem/router). Usually, the first three devices are connected to the internet through the fourth one (the set-top box). As such, all the "data requests" (service requests) would go through the set-top box as well. As a toy example, it is needed to monitor if the webcam is behaving as expected. The webcam is supposed (according to terms of use) to upload images to a certified server in France, some content of the service request would be under the form: webcam→images→set-top box→French server. Then at some point, the network manager then reports that the webcam is starting to upload images to a Chinese server, the reported service request becomes: webcam→images→set-top box→Chinese server.

The last service request indicates a behavior that is not expected and has to be reported via the blockchain such that everybody in the world gets to know that a specific webcam model is not acting as expected (thus lowering down its reputation). As such, the report transaction created by the set-top box could be as follow "webcam→images→set-top box→Chinese server; webcam ID=X misbehaving".

The above process requires the miners to validate the transaction before storing it within the blockchain. According to some solutions, miners only control if the set-top box has been previously "paired" with the webcam (which indeed happened since the webcam is interacting with the set-top box) but cannot verify the trustworthiness of the transaction content since they cannot interact with the webcam themselves. Thanks to the network scenario, the laptop and the smart TV can act as network controllers and can check the real service request (especially by means of the hash the service request) and provide the service request as a report to the blockchain.

In an illustrative manner including interpretation of the behavior, these final results have to be analyzed by the miners:

set-top box→blockchain transaction (webcam ID=X; Chinese server; misbehaving)→blockchain miners→blockchain laptop→blockchain transaction (webcam ID=X; French server)→blockchain miners→blockchain smart TV→blockchain transaction (webcam ID=X; French server)→blockchain miners→blockchain The miners still cannot verify themselves the content of the transaction, i.e. verify if the webcam is uploading images to Chinese or French server. However, they can analyze the reported service request and detect that one device (set-top box as network manager) reported that webcam is communicating with China while two others (laptop and smart TV as network controllers) reported that the camera is communicating with France. As such, the miners will discard the transaction related for "misbehaving". Indeed, the network controllers cannot verify what the communication device is doing as they do not have related terms of use and as such they only act as validators of what the network manager is reporting. As a result, a compromised set-top box cannot report fake behaviors on devices.

In another specific illustrative example, the miners see the following transactions sent to the blockchain:

the following one set-top box→blockchain transaction (webcam ID=X; Chinese server; misbehaving)→blockchain miners or the following two set-top box→blockchain transaction (webcam ID=X; Chinese server; misbehaving)→blockchain miners laptop→blockchain transaction (webcam ID=X French server)→blockchain miners In all cases, the report of the set-top box will not be accepted and written within the blockchain since miners do not have a "majority" of service requests that correlate the report of the set-top box (there is only one request in the first case and two contradicting requests in the second one). As long as there is not a majority of network controllers reporting on the same service request as the one reported by the set-top box, the report of the set-top will not be mined (i.e. accepted) within the blockchain with the final result that the reputation of the communication device will not change.

An embodiment comprises a communication device under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

The invention claimed is:

1. An apparatus comprising:
    at least one processor; and
    at least one memory including computer program code;
    the at least one memory and the computer program code configured to, with the at least one processor, cause the apparatus at least to:
    send a message including a query for an available network controller and network manager,
    receive information from the available network controller and the network manager, and
    exchange cryptographic keys between the apparatus, the available network controller and the network manager,
    wherein the message sent by the apparatus comprises a public key (CD-Pk) of the apparatus and information from the available network controller is received with a public key (Pk-N) of the available network controller, the public keys being used for encrypting communication between the apparatus and the network controller.

2. The apparatus of claim 1, wherein the apparatus is further configured to cause to:
    send a service request via the network manager to a communications network and in the message to the network controller, the service request serving as a basis for a first report on behavior of the apparatus to be sent by the network manager.

3. The apparatus of claim 2, wherein the apparatus is further configured to cause to:
    store the sent service request and a hash of the service request for future validation.

4. The apparatus of claim 3, wherein the apparatus is further configured to cause to:
    establish connection with the available network controller having received the service request in the message from the network manager, and
    send the stored service request previously sent to the network manager to the available network controller, for the network controller to create a report based on the service request to be sent by the network controller for a validation of the first report by a blockchain network.

5. The apparatus of claim 4, wherein the apparatus is further configured to cause to: send the stored hash of the service request in addition the service request for network controller to create a report for the validation of the first report.

6. The apparatus of claim 4, wherein the information received includes information for a plurality of available network controllers, and wherein the first report is validated if a majority of the network controllers have sent a report with the same service request as the service request serving as basis for the first report.

7. The apparatus of claim 1, wherein the message comprises a broadcast message sent within a wireless range of the apparatus.

8. The apparatus of claim 1 wherein the information received includes information for a plurality of available network controllers, and wherein the apparatus is further configured to cause to:
    verify the apparatus to be used if validation is supported by a required number of the network controllers.

9. The apparatus of claim 1, the apparatus is further configured to cause to select the network manager and the network controller automatically using predetermined parameters or select the network manager and the network controller shown m a user interface of the apparatus.

10. An apparatus comprising:
    a processor coupled to one or more network interfaces and configured to execute one or more processes; and
    a memory configured to store a process executable by the processor, the process when executed operable to:
    receive a message from a communication device, the message including a query for available network controllers and network manager,
    send information for the available network manager and the available network controllers to the communication device,
    receive a service request from the communication device and route the service request to a communication network,
    determine a behavior of the communication device,
    generate a first report on the behavior of the communication device, the report containing the service request and the determined behavior of the communication device, and
    send a message to the available network controllers, the message containing the service request, for retrieving the service request previously sent to the network manager by the communication device, the retrieved service request serving as a basis for a report to be generated by each network controller for a validation of the first report.

11. The apparatus of claim 10, wherein the message contains a hash of the service request and a query to report the service request received from the communication device.

12. The apparatus of claim 10, wherein the behavior of the communication device is determined by analyzing the content of the service request with respect to an expected behavior.

13. The apparatus of claim 12, wherein the behavior of the communication device is described by a manufacturer of the communication device.

14. An apparatus comprising:
    a processor coupled to network interfaces and configured to execute one or more processes; and
    a memory configured to store a process executable by the processor, the process when executed operable to:
    receive a message from a communication device, the message including a query for available network controllers and network manager,
    send information of the available network controllers and the network manager to the communication device,
    receive a message from the network manager, the message containing a service request received by the network manager from the communication device, the service request further serving as a basis for a first report on behavior of the communication device to be sent by the network manager,
    establish connection with the communication device,
    receive the service request previously sent to the network manager from the communication device, and
    generate a report based on the service request for a validation of the first report by a broadcast network.

15. The apparatus of claim 14, wherein the apparatus is further configured to receive a hash of the service request from the network manager and to further receive a hash of the service request from the communication device, and wherein the network controller creates the report if the hash sent by the communication device corresponds to the hash sent by the network manager.

16. The apparatus of claim 15, wherein if the hash of the service request received from the communication device and the network manager are not the same, the request is rejected by the network controller.

17. The apparatus of claim 14, wherein the report sent to a blockchain by the network controller is in the form of a smart contract to be executed by miners.

18. The apparatus of claim 14, wherein the apparatus is further configured to cause to verify the network manager if the report is supported by a required number of the network controllers.

19. The apparatus of claim 14, wherein the apparatus is further configured to cause a query for the service request previously sent to the network manager from the communication device.

\* \* \* \* \*